United States Patent [19]

Monte

[11] 3,914,524

[45] Oct. 21, 1975

[54] HIGH AMYLOPECTIN STARCH ADHESIVE COMPOSITION AND ADHESIVE TAPE

[75] Inventor: Robert W. Monte, Merrimack, N.H.

[73] Assignee: Nashua Corporation, Nashua, N.H.

[22] Filed: July 1, 1974

[21] Appl. No.: 484,596

[52] U.S. Cl..... 428/533; 260/17.4 SG; 260/17.4 ST
[51] Int. Cl.$^2$...................... B32B 23/04; C08L 3/12
[58] Field of Search.............. 260/17.4 ST, 17.4 SG; 117/122 PA, 122 R; 161/266

[56] References Cited

UNITED STATES PATENTS

| | | | |
|---|---|---|---|
| 3,050,425 | 8/1962 | Carr et al............................ | 161/266 |
| 3,684,749 | 8/1972 | Arai et al............................ | 117/122 |
| 3,696,065 | 10/1972 | Hoffman et al..................... | 117/122 |
| 3,725,122 | 4/1973 | Reinhard et al.................... | 117/122 |

OTHER PUBLICATIONS

Chem. Abst. 71:51467f, "Remoistening Adhesive – – – – Compositions," 1969, Kokoska.
Chem. Abst. 72:56976b, "Remoistenable Adhesive-Starch-Glue," 1970, Mentzer.
Chem. Abst. 68:14280g, "Starch-Based Remoistenable Adhesive;" 1968, Mentzer.
Chem. Abst. 74:65034m, "Water-Resistant Adhesives;" 1971, Imoto et al.
Chem. Abst. 73:15720r, "Adhesives for Gummed Strips," 1970, Arai et al.

Primary Examiner—Donald E. Czaja
Assistant Examiner—Edward Woodberry
Attorney, Agent, or Firm—Kenway & Jenney

[57] ABSTRACT

An adhesive composition suitable for application to a paper backing to form an adhesive tape comprising amylose pectin, a medium molecular weight starch, urea, a sugar or sugar alcohol, a neutralized polyacrylate and water. The composition can be applied to one surface of a paper backing to form an adhesive tape suitable to be wound as a roll without premature bonding and without loss of adhesive strength.

5 Claims, No Drawings

HIGH AMYLOPECTIN STARCH ADHESIVE COMPOSITION AND ADHESIVE TAPE

BACKGROUND OF THE INVENTION

This invention relates to an adhesive composition and to an adhesive tape employing said composition.

Prior to the present invention, adhesive compositions have been employed as a coating on thin paper strips to form paper-backed adhesives employed to join the ends of paper board forms, particularly boxes. At the present time, animal glue-based adhesives are employed since no satisfactory synthetic adhesive has been found. To obtain satisfactory adhesion in this system, it is necessary that it have correct tack and setting characteristics as well as strength characteristics in order to be employed in present machine-operated manufacturing techniques. In this application, the tape generally is rolled from a cylindrical roll of the tape, passed over a water applicator such as brush and then to the surface of the paper board at the desired location. If the adhesive is too tacky, it will not unroll from the paper roll at the satisfactory rate since it will stick to the adjacent paper undesirably. Furthermore, if the adhesive does not have the correct degree of tack and setting, it will become loosened within a relatively short time after application to the paper board. Up to the present time, no synthetic-based adhesive has been found satisfactory for this purpose so that, up to the present time animal glue-based adhesives have been employed uniformly. However, animal glues recently have become unsatisfactory due to a greatly increased cost which has provided an incentive to form alternative adhesive systems.

Accordingly, it would be highly desirable to provide an adhesive system that can be applied to paper sheets, whether or not enforced with fibers such as fiberglass, in order to provide sealing tapes or box tapes which can be applied with conventionally available apparatus.

SUMMARY OF THE INVENTION

The present invention is based upon the discovery that a vegetable-based adhesive composition can be applied to paper sheets, whether or not reinforced, to form a sealing tape or box tape that can be applied quickly to a paper board to form quick setting, strong bonding which equals or exceeds the strength characteristics of presently employed animal-based adhesive compositions. The adhesive compositions of this invention contain amylose pectin in major amounts to maintain the tackiness of tackifiers added to the composition and to provide the desirable adhesive strength. In addition, the compositions of this invention contain a medium molecular weight starch such as dextrin to provide tack, urea to provide tack and water absorption to the desirable degree, a sugar or sugar alcohol which plasticizes the amylose pectin and retains water to maintain adherence and a neutral metal salt of a polyacrylate which improves tack and promotes penetration of the adhesive composition into the paper board. It is critical that the relative concentrations of each of these components be maintained within strict limits to maintain the desirable results as set forth more specifically below.

DESCRIPTION OF SPECIFIC EMBODIMENTS

The weight percentages given herein are based upon the weight of the amylose pectin in the composition of this invention. The amylose pectin provides cohesive strength to the overall adhesive composition as well as providing tackiness thereof. It is desirable to employ a corn starch having as high a concentration of amylose pectin and as low a concentration of amylose as possible in order to maintain high adhesion of the composition. Suitable starches which can be employed include corn starch, tapioca starch, and potato starch. A particularly preferred starch component is sold by American Maize Corporation under the trade name Amaizo 839 which is grown from a hybrid corn and contains more than about 95 weight percent amylose pectin.

The medium molecular weight starch has a molecular weight within the range of between about 20,000 and about 50,000 and functions to increase initial tack of the overall adhesive composition when the adhesive composition is remoistened just prior to use. The medium molecular weight starch is employed in amounts of between about 2.0 and about 10.0 weight percent, preferably between about 3.0 and about 6.0 weight percent. When the concentration of the medium molecular weight starch is too high, the cohesive strength of the overall adhesive composition is undesirably reduced. When the concentration of the medium molecular weight starch is too low, the tack of the overall adhesive composition is too low to provide desirable quick adhesion.

The urea functions to plasticize the amylose pectin and to absorb water into the overall adhesive composition. If urea is not employed, the adhesive composition, when remoistened, does not absorb water to a sufficient degree or at a sufficiently high rate to provide ease of application to the board substrate since water is not readily absorbed by starch alone. The concentration of urea employs between about 1.5 percent and about 6 percent by weight. When urea concentrations in amounts greater than about 6 weight percent are employed, the adhesion of the resultant composition is undesirably reduced. On the other hand, when the concentration of urea is below about 1.5 weight percent, the water receptivity of the overall adhesive composition is undesirably reduced. While plasticizers for starch other than urea are well known, it has been found that only urea provides both the desirable degree of plasticization and water absorption, both of which are essential in the composition of this invention. For example, the following plasticizers, in the absence of urea are inoperative: glucose, brown sugar, glycerin, petrolatum and sulfonated oils.

The sugar or sugar alcohol component also functions to plasticize the amylose pectin or starch and therefore complements the urea component in this regard. However, more importantly, the sugar or sugar alcohol permits water retention by the adhesive composition after it has been remoistened just prior to adherence to a substrate. Thus, the sugar or sugar alcohol permits a relatively long process time between the time of remoistening the adhesive and the time of application to the substrate. The sugar or sugar alcohol is employed in amounts of between 5.0 and about 10.0 weight percent. Exemplary sugars or sugar alcohols include sorbitol, glucose, maltose or mannitol or the like; with sorbitol being preferred. When the sugar or sugar alcohol concentration is too high, the adhesive strength of the resultant composition is reduced and the adhesive is rendered undesirably hygroscopic so that, upon standing, water will be absorbed from the air and either will promote premature bonding of the rolled tape or, after being applied to a desirable substrate, will cause reduced adhesive strength.

The neutralized polyacrylate also improves tack of the overall composition, but more importantly, promotes penetration of the adhesive into the substrate paper board. It has been found that the acidic polyacrylates are not useful for this purpose and therefore are undesirable. Exemplary neutral polyacrylates which can be employed are sodium polyacrylate, and potassium polyacrylate; with sodium polyacrylate being preferred. The neutralized polyacrylate has a molecular weight of between about 450,000 and about 600,000 and is employed in amounts of between about 1.0 and about 6.0 weight percent.

The adhesive composition, after being applied to a paper backing to form a tape, also contains water in amounts of between about 6.0 and about 9.0 weight percent in order to promote remoistening of the adhesive composition while preventing the adhesive composition from becoming brittle so that gaps in the adhesive coating on the tape are prevented.

It is to be understood that each of the components set forth above for the adhesive composition are essential in that if any of the components are either eliminated or employed in concentrations other than set forth above, the resultant adhesive composition is not useful in presently employed methods for applying the adhesive-coated paper tape to a corrugated liner board during box manufacture. Furthermore, additional normally-employed adhesive modifiers can be added to the adhesive composition to vary the adhesive properties as desired. For example, film-forming polymers such as polyvinylpyrrolidone can be added to increase leginess or petrolatum can be added to improve film flexibility.

The compositions of this invention are prepared by first heating the main starch component containing the high concentration of amylose pectin and the medium molecular weight starch either separately or together in admixture with water in order to convert the starch. Generally, the components can be cooked at a temperature of less than about 210°F, generally about 200°F for a period of at least 30 minutes. If desired, super-atmosphere pressures can be employed during cooking to reduce cooking temperature and/or cooking time. Thereafter, each of the remaining ingredients with the exception of the polyacrylate component are added to the cooked starch mixture and admixed therewith. After these components have been added, the polyacrylate component is added last and admixed with the resultant composition. Water then is added and admixed therewith to provide a fluid composition which can be applied to a paper surface to form a paper tape. Generally, water is added in amounts of between about 5.0 and about 10.0 weight percent, in order to bring the total solids content from about 40 and 50 weight percent to promote ease of application to the paper substrate while minimizing the drying time during the production of paper tape rolls. Prior to rolling the adhesive-coated paper into rolls, the adhesive dries to a water weight percent of between about 4.0 and about 6.0 based on the weight of the total composition in order to permit the adhesive-coated paper to be rolled into paper rolls without premature bonding while permitting the adhesive to be subsequently remoistened quickly prior to application to a paperboard substrate.

The following example illustrates the present invention and is not intended to limit the same.

EXAMPLE I

This example illustrates a suitable procedure for preparing a preferred composition of this invention.

To a vessel provided with mixer and a source of live steam was added 60 gallons of water and agitation thereof initiated. The water was heated to about 120°F. Six hundred and sixty pounds of amylose pectin in the form of Amaizo 839 then was added continuously to the agitated water over a period of about 15 minutes and the resultant mixture had a viscosity of about 8,000 centipoises. During addition of the amylose pectin, the mixture was heated to about 200°F. After completion of the amylose pectin addition, the mixture was maintained at 190°–200°F for about 30 minutes and the steam then was shut off. Thirty pounds of dextrin was added to the heated mixture over a period of about 5 minutes and the resultant mixture was agitated until uniform. The total solid content of the composite was about 47 weight percent. Thereafter sequential addition of the following components was effected while the aqueous composition was still warm: 15 pounds urea, 45 pounds sorbitol and 17 pounds sodium polyacrylate which is sold by Standard Brands, Inc. under the tradename, Tychem 9501. This resulted composition was mixed for about 10 minutes to obtain a uniform composition.

The adhesive composition then is applied to a fiberglass reinforced Kraft paper backing by being passed in the nip formed by a coating roll and two smaller nip rolls in a "kiss-roll" system. During application the adhesive composition is maintained at about 170°F. After being coated, the paper is passed through an oven maintained at a temperature between 300° and 500°F to reduce the tackiness of the adhesive. A suitable coating weight is between 17 and 20 pounds per ream of paper. The adhesive-coated paper is then wound on a disperser roll.

The adhesive-coated paper had a tensile strength of 71.0 lbs./inch in the machine direction and 73.0 lbs./inch in the cross-machine direction. The coated paper was found to have a McLaurin Value of 75.0 to 90. The coated paper was tested in a Fipago Testor, by moistening the paper, allowing an open setting time of 3 seconds and a closed setting time of 2 seconds. A typical value for the coated paper in the Fipago Testor was 73.5 In a quick-grab test, the paper was moistened and applied to a corrugated carton. A closed setting time of only 7 seconds was needed to produce a fiber tearing bond.

I claim:

1. An adhesive tape suitable to be wound as a roll without premature bonding and without loss of adhesive strength which comprises a paper backing having coated on one surface thereof an adhesive composition comprising:

| | | |
|---|---|---|
| (1) | a starch high in amylose pectin; | |
| (2) | a medium molecular weight starch having a molecular weight of from 20,000 to 50,000 | in an amount of from 2.0 to 10.0 wt.%, |
| (3) | urea | in an amount from 1.5 to 6.0 wt.%; |
| (4) | a component selected from the group consisting of sugar or sugar alcohol | in an amount from 5.0 to 10.0 wt.%; |

-Continued

| | |
|---|---|
| (5) a neutralized polyacrylate having a molecular weight of from 450,000 to 600,000 | in an amount of 1.0 to 6.0 wt.%; and |
| (6) water | in an amount from 4.0 to 6.0 wt.% | wherein the weight percents are based upon the weight of amylose pectin.

2. The tape of claim 1 wherein the sugar alcohol is sorbitol.

3. The tape of claim 1 wherein the medium molecular weight starch is dextrin.

4. The tape of claim 1 wherein the polyacrylate is sodium polyacrylate.

5. The tape of claim 1 wherein the first named starch component contains more than 95 weight percent amylose pectin.

* * * * *